US005540307A

United States Patent [19]

Pickering

[11] Patent Number: 5,540,307

[45] Date of Patent: Jul. 30, 1996

[54] RESCUE SYSTEM

[76] Inventor: Gregory R. Pickering, 362 Jack Rettie Court, New Market, Ontario, Canada, L3Y 7X8

[21] Appl. No.: 291,525

[22] Filed: Aug. 16, 1994

Related U.S. Application Data

[62] Division of Ser. No. 928,009, Aug. 12, 1992, Pat. No. 5,348,116.

[51] Int. Cl.[6] .......... F16D 63/00

[52] U.S. Cl. .......... 188/188; 188/82.7

[58] Field of Search .......... 188/65.2, 65.1, 188/82.1, 82.4, 82.7, 82.8, 188, 189; 192/45.1; 182/5, 7; 254/154

[56] References Cited

U.S. PATENT DOCUMENTS

| | | | |
|---|---|---|---|
| 790,001 | 5/1905 | Perry . | |
| 1,071,502 | 8/1913 | Boufford | 182/241 X |
| 1,650,281 | 11/1927 | Knudson | 188/65.1 |
| 1,961,081 | 5/1934 | Schrader | 24/134 |
| 3,602,483 | 8/1971 | Russell | 254/157 |
| 3,703,218 | 11/1972 | Brda | 182/6 |
| 3,717,219 | 2/1973 | Hoffman | 188/65.4 X |
| 3,759,346 | 9/1973 | Brda | 182/7 |
| 3,807,696 | 4/1974 | Brda | 254/154 |
| 3,830,346 | 8/1974 | Watts | 188/188 |
| 4,029,177 | 6/1977 | Fiss | 188/188 X |
| 4,580,658 | 4/1986 | Brda | 182/5 |
| 4,883,146 | 11/1989 | Varner et al. | 188/65.2 |
| 4,938,435 | 7/1990 | Varner et al. | 188/184 |
| 5,038,888 | 8/1991 | Varner et al. | 182/5 |
| 5,070,962 | 12/1991 | Varner | 182/7 |
| 5,131,491 | 7/1992 | Varner et al. | 188/65.2 |
| 5,168,958 | 12/1992 | Wullimann | 182/236 |

FOREIGN PATENT DOCUMENTS

| | | | |
|---|---|---|---|
| 0534405 | 2/1977 | U.S.S.R. | 188/188 |
| 9210 | 10/1908 | United Kingdom | 188/188 |

*Primary Examiner*—Robert J. Oberleitner
*Assistant Examiner*—Peter M. Poon
*Attorney, Agent, or Firm*—Nixon & Vanderhye P.C.

[57] ABSTRACT

A centrifugal brake for use with a hoist having a rope wound around a rope drum mounted on a support plate, includes a housing adapted for attachment to the support plate, the housing having a rope wheel mounted on one end of a shaft for rotation with the shaft. The housing is formed with a thru slot for allowing a load end of the rope to pass therethrough in a first direction as the rope unwinds from the rope drum. The rope is adapted to engage a peripheral surface of the rope wheel to thereby cause the rope wheel to rotate as a function of rope speed. The shaft has another end fixed to a centrifugal brake wheel having at least one pawl pivotably mounted thereon for swinging movement between inoperative and operative positions as a function of speed of rotation of the rope wheel. A cam is provided which is movable into engagement with the rope to stop movement of the rope through the housing upon movement of the at least one pawl to the operative position.

24 Claims, 9 Drawing Sheets

FIG. 1
(PRIOR ART)
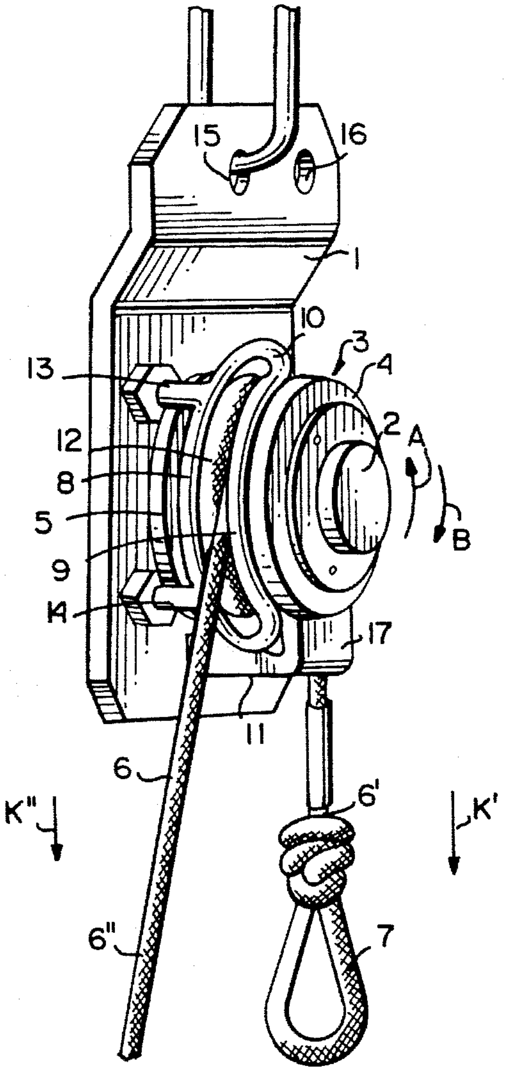
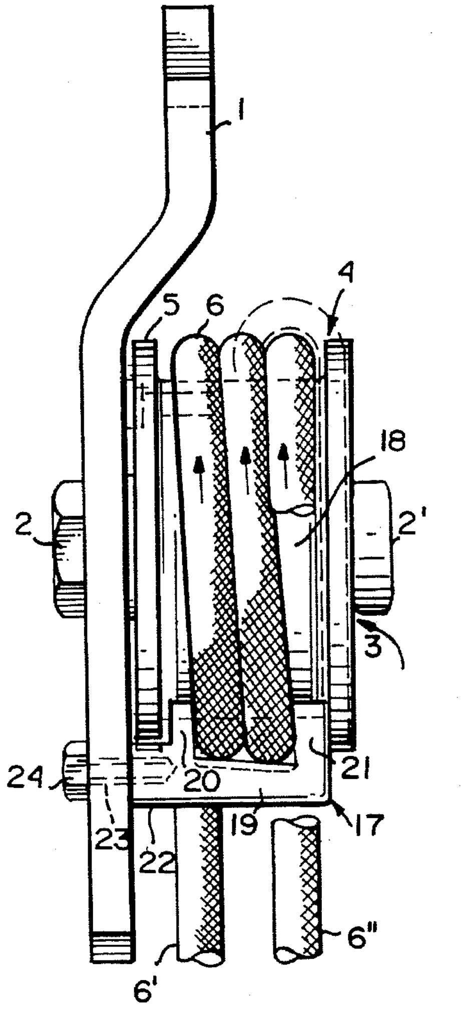
FIG. 2
(PRIOR ART)

FIG. 4 A
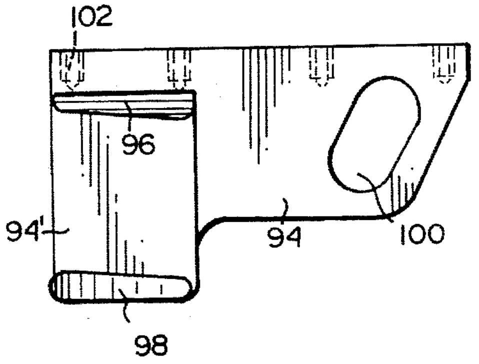
FIG. 3
(PRIOR ART)
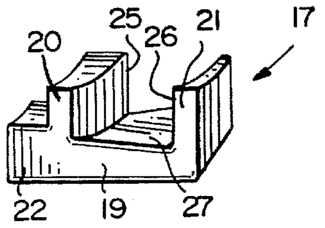
FIG. 4
FIG. 4B
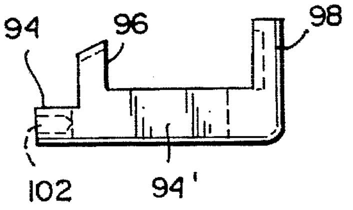
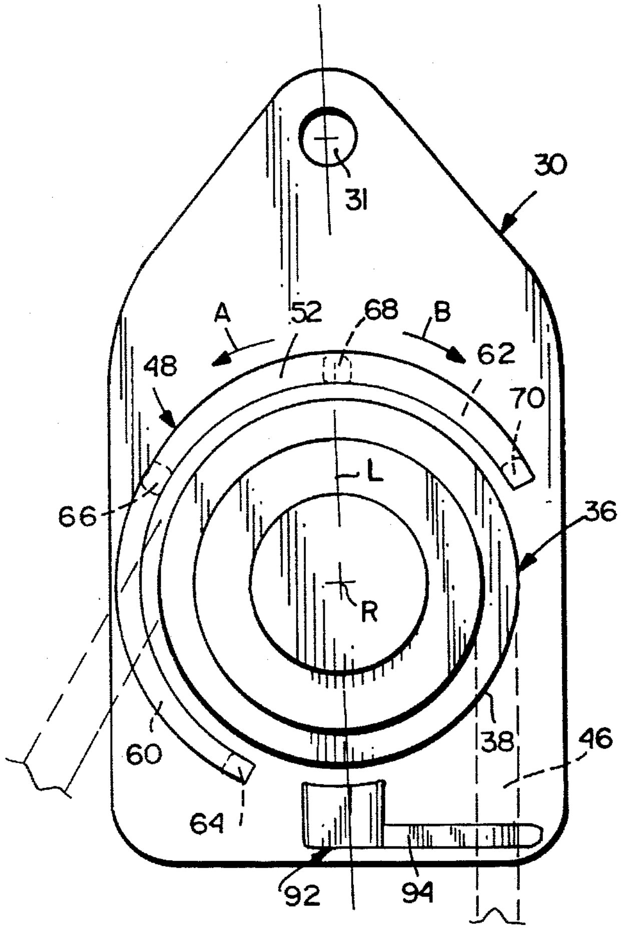

FIG. 18
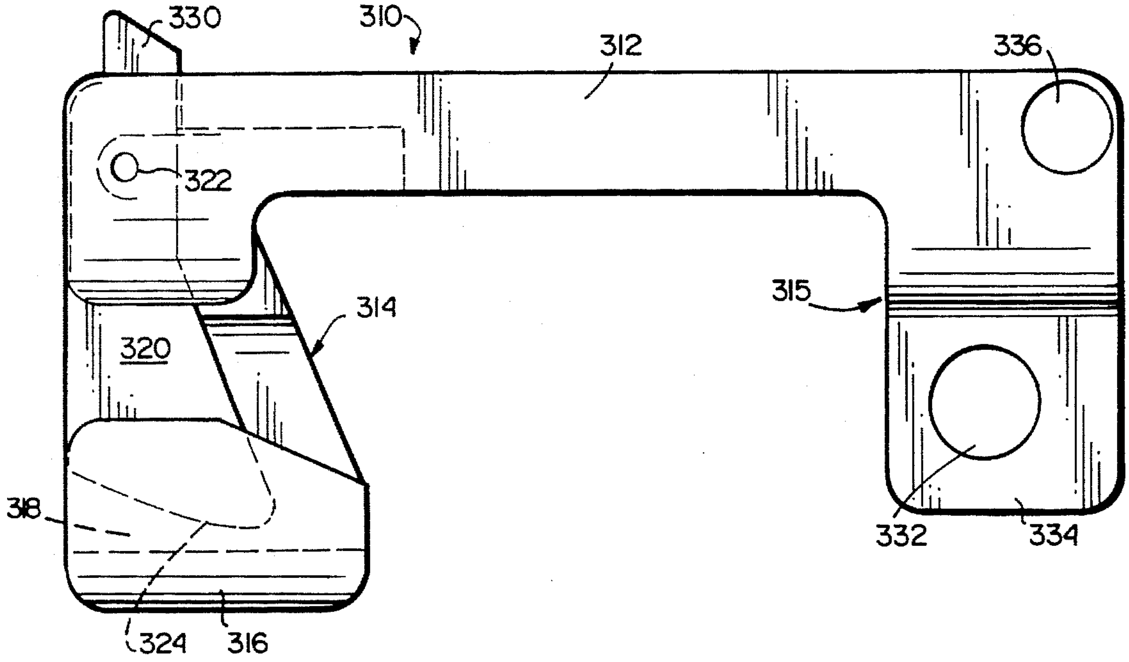
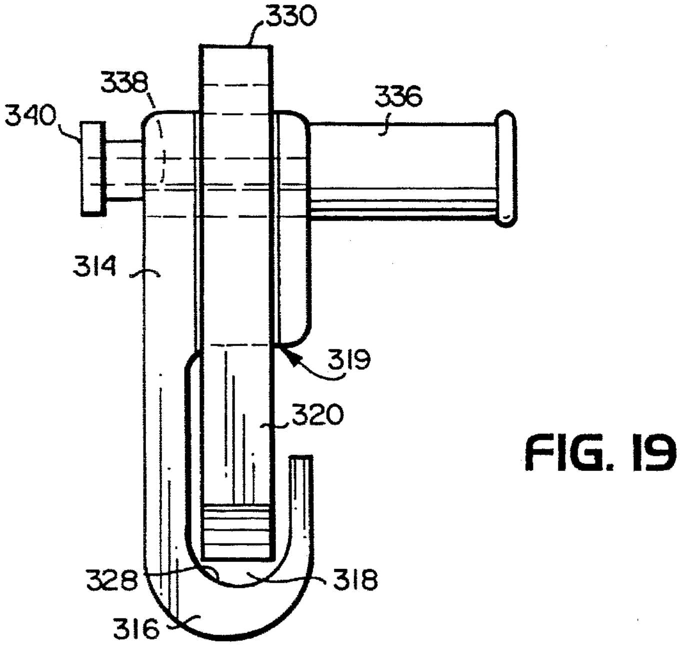
FIG. 19

RESCUE SYSTEM

This application is a Division of application Ser. No. 07/928,009 filed Aug. 12, 1992 and now U.S. Pat. No. 5,348,116.

BACKGROUND AND SUMMARY OF THE INVENTION

The present invention relates to rescue apparatus which includes as an essential element a rescue hoist designed for lowering or lifting persons or loads quickly and easily without a substantial effort on the part of the operator of the system. Other unique, but optional, components of the system include a centrifugal brake device, a swivel pulley and a handled ascender to be used along with the hoist.

One conventional hoist device includes a rope drum supported on a bolt extending from a bracket by a free wheeling bearing or so-called roller friction clutch which permits the rope drum to freely rotate in one direction (counter clockwise, in the exemplary description) but which blocks rotation of the drum in the opposite direction (clockwise in the exemplary description). In a typical load lowering application, a rope is wound around the drum at least for 1½ and usually 2½ (depending on rope diameter) turns so that a braking force is applied to the rope as it glides over the drum surface in the direction in which the drum rotation is blocked. In other words, the braking action results from the friction between the rope and the drum surface as the rope is wound onto and then off the non-rotating drum under the downward loading influence of the person (or object) being lowered. The load end of the rope is generally connected to one or more pulleys downstream of the hoist which provide a mechanical lifting advantage so that the operator need only exert a slight counterpull in order to control the descent of the person being lowered.

Hoisting devices of this type are disclosed in U.S. Pat. Nos. 3,703,218 and 3,807,696. In the latter patent, improved rope guide devices for the rope drum are disclosed. One arc-shaped guide is in the form of two laterally spaced bails arranged along a portion of the circumference of the rope drum and connected at the ends, forming a slot through which the rope may pass. The arrangement is such that one end of the rope, the so-called control end of the rope, may be guided onto the drum through the rope guide slot from various directions relative to the drum.

The '696 patent also discloses a lower rope guide block which comprises a pair of side members and a bridging member interconnecting the side members such that the rope guide block reaches over the space which is taken up on the surface of the rope drum by the turns of the rope. The inwardly facing surfaces of the side members of the guide block and the outwardly facing surface of the rope drum as well as the inwardly facing surface of the bridging member of the guide block, forms a rope guide chamber which has a shape which defines the position of adjacent rope turns where the rope guide block reaches over the outer surface of the rope drum.

Even with the improvements described in the '696 patent, problems remain. For example, it has been determined that there is excessive space between the rope riding on the drum and the arc-shaped rope guide which allows the rope to overlap and tangle. There is also excessive space between the roller drum surface and the arc-shaped rope guide which has caused problems in that, if proper care is not taken, the rope can lift off the roller drum and slip between the roller drum and the arc-shaped rope guide thereby jamming and totally disabling the unit.

In addition, a natural occurrence when raising a load (with the drum rotating in a counterclockwise direction) is for the rope on the drum to "corkscrew" towards the rear of the drum. With no lower rode guide, as new rope comes onto the drum, it will "stack up" and overlap the rope already on the drum. This can occur immediately upon commencing raising and can totally disable the unit. The lower rope guide block of the '696 patent is said to prevent the rope from "stacking up" and overlapping during raising. This is accomplished by positioning the rope guide block such that it prevents the rope on the drum from moving too far back, thus allowing a space for the new rope to come onto the drum. However, this configuration creates a considerable amount of friction between the rope and the lower rope guide block, reducing the system's efficiency and greatly increasing the amount of force required to lift a given load. Moreover, even with the lower rope guide block in place, existing systems have allowed the rope on the drum to overlap and tangle under wet, dirty conditions because as the rope becomes wet and soiled, the friction between the rope and the rope drum increases, allowing the rope to "corkscrew" farther back than normal and thus, wedging under the new rope coming onto the drum.

It is the object of the present invention to provide an improved hoist device which eliminates the problems described above with regard to the drum and the conventional arcuate rope guide and associated lower guide block. Thus, in one aspect of the present invention, the cylindrical rope engaging surface of the drum is modified to include an upwardly and rearwardly directed taper in that portion of the drum closest to the hoist support bracket or backplate. The tapered roller drum prevents overlapping during raising even with no lower rope guide block installed, and thereby greatly improves the efficiency of the system by the attendant reduction of friction. More specifically, the tapered surface of the drum forces the rope coming on to the drum during a lifting operation to slide off the taper towards the front of the drum, so that there is always space created for new rope to come onto the rear of the drum. This action works more effectively with increased load and works very well with as little as ten pounds load. However, the tapered surface is less effective when simply retrieving rope with no load. Therefore, it is preferred to utilize a lower rope guide block along with the tapered rope drum to prevent overlapping under a no load raising situation.

In another aspect of the present invention, an improved arcuate rope guide cage is provided which solves the above described excessive space problems in that there is no longer sufficient space between the arcuate rope guide cage and the rope on the drum to allow the rope to overlap itself, and because the arcuate rope guide cage is longer and positioned much closer to the drum than the known arcuate guide rope cage so as not to allow the rope to slip between it and the drum.

The present invention also provides additional associated (optional) components which form part of an overall rescue system, with the above described hoist as the principal component thereof. The additional components described below have been designed to avoid additional problems which have been experienced with known rescue system components.

For example, another problem with existing rescue systems utilizing a hoist of the type described above is that if the operator should let go of the control end of the rope during a lower operation, the person being lowered will descend at a dangerously high speed. This invention therefore provides a centrifugal brake device for use with the hoist which constantly senses rope speed while lowering, and if an excessive speed is reached, the brake will automatically "grip" the rope and prevent further descent. The centrifugal brake device in accordance with an exemplary embodiment of this invention may be installed on the drum bracket or backplate via a mounting slot and appropriate fastening means. The system is assembled so that the rope coming off the drum passes through an opening in the centrifugal brake device. Within the device, there is a tapered rope wheel designed to engage the rope as the rope travels downwardly during a lowering operation. However, the natural tendency of the rope to travel along the drum during raising ensures that the rope will not contact the tapered rope wheel during a raising operation, and therefore, the device adds no additional friction during raising so that overall system efficiency is maintained.

In the exemplary embodiment, the rope coming off the rope drum during lowering will contact the tapered rope wheel causing the latter to spin with a horizontal shaft to which it is rigidly secured. A centrifugal disk is located at the other end of the shaft and mounts a pair of spring loaded pawls which are held in a normally retracted position by springs or the like. As lowering speed increases, the centrifugal disk rotational speed will increase to the point where the pawls will pivot radially outwardly overcoming the retraction force of the springs. Upon reaching a predetermined speed, the pawls will have moved radially outwardly sufficiently so that one of the pawls will contact the lower end of a vertical connecting rod and drive the latter into engagement with the lower surface of a rope locking cam. This rope locking cam is a wedge shaped component which is pivotally secured to the device so that, upon active engagement with the connecting rod, the rope cam will sandwich the rope between it and the roller drum, thereby stopping further movement of the rope. Once activated, the cam remains engaged and the person on the system remains stopped. In order to disengage the centrifugal brake and resume lowering, the operator must simply raise the load slightly thereby pulling the cam upwardly to release it, at which point, a spring associated with the cam will return the cam to its normal disengaged position. The centrifugal brake is thus automatically reset and ready for further activation if and when required.

Another problem with existing systems of the type described above is that when using the system for certain types of work or rescue, i.e., in a confined work space (entry into manholes, underground electrical vaults, tanks, etc. ), the person connected to the system inevitably will twist the ropes by turning around naturally as he performs his work. A problem arises in that, if an emergency rescue (raising) must be performed, the twisting of the ropes causes large amounts of friction to occur and, depending on the degree of twist, may render the operator incapable of raising the person as the force required will be simply too great.

In still another aspect of the present invention, therefore, a swivel pulley is provided which allows the person connected to the hoist system to move and to rotate 360° without twisting the ropes. The arrangement is such that the lower part of the swivel (connected via a conventional carabiner to the person) will turn, but the upper part connected to the pulley, ropes and hoist will not.

Another aspect of the rescue system in accordance with this invention relates to rope control handles or, as they are known in the art, "handled ascenders". Such devices are often used in mountain climbing to pull oneself up along an otherwise stationary rope. In rescue operations, handled ascenders may be used, for example, to haul on the rope, i.e., to lift a load from a control end of the rope. Existing handled ascenders are manufactured in right-hand and left-hand versions, with closed loop handles. The thumb or forefinger is used to disengage a cam from the rope to allow the rope to slide through the ascender. A problem arises in that it is awkward to disengage the cam and, in fact, impossible to disengage the cam if wearing gloves or mitts, because the cam is located within a closed loop, accessible from either side of the ascender. In addition, having both left and right-handed versions makes it difficult for a person of the "opposite hand" to operate the ascender. The closed loop handle design of the existing ascenders also makes them difficult and often impossible to hold at all when wearing bulky gloves or mitts, as typically required in cold weather situations. In accordance with this invention, there is provided an improved handled ascender which features a cam design with an integral lever protruding from the rear of the ascender which can be operated with equal ease by a left or right-handed person, and which is very simple to operate even with large bulky gloves or mitts. An open handle design also allows even the largest mitted hands (either left or right) to easily hold and operate the ascender.

In broad terms, the invention thus provides a rescue system comprising a hoist including a backplate; a rope drum mounted on the backplate, the rope drum capable of rotation in one direction only; the rope drum having a front and rear end plates on either side of a rope engaging surface, the rope engaging surface including a cylindrical portion and a tapered portion, the tapered portion located adjacent the rear end plate; the hoist further comprising an arcuate rope guide including a thru slot fixed to the backplate and extending partially about the drum.

In another aspect, the invention provides a rescue system comprising: a hoist including a backplate; a rope drum mounted on the backplate, the rope drum having a rope engaging surface located between a pair of circular end flanges, the rope dream capable of rotation in a first direction in response to a pulling force applied to a control end of a rope wound around the rope drum at least one and one half times, and the drum being blocked against rotation in an opposite direction such that a frictional braking force is applied to the rope when a pulling force is applied to a load end of the rope in a second direction opposite the one direction; and a rope guide fixed to the backplate, the rope guide formed by a pair of elongated laterally spaced legs connected at opposite ends of the rope guide to define therebetween at least one rope slot, the rope guide having an arcuate shape conforming substantially to the circular end flanges of the rope drum, wherein the rope guide extends circumferentially at least 200° about the end flange.

In still another aspect, the invention provides in a rescue system including a hoisting apparatus which includes a backplate, a rope drum mounted on the backplate, the rope drum adapted to receive a rope thereon, wound at least one and one half times about a rope engaging surface on the drum, the rope having a load end and a control end, the drum rotatable in one direction when a pulling force is exerted on the control end and blocked against rotation in an opposite direction when a pulling force is exerted on the load end such that the rope drum provides a braking force on the rope when the pulling force is exerted on the load end; an improvement comprising:

a) an arcuate rope guide fixed to the backplate and extending at least 200° about the drum; and b) the rope engaging surface including a cylindrical portion and a tapered portion, the tapered portion lying closest to the backplate.

It will be appreciated that the invention also relates to the utilization of the optional components including the centrifugal brake mechanism, the swivel pulley and the handled acsender as described generally above and as described in greater detail further herein.

Other objects and advantages of the invention over and above those described above will become apparent from the detailed description which follows.

BRIEF DESCRIPTION OF THE DRAWINGS

FIG. 1 is a perspective view of a conventional hoist device used in known rescue systems and as disclosed in U.S. Pat. No. 3,807,696;

FIG. 2 is an end view of the hoist illustrated in FIG. 1;

FIG. 3 is a perspective view of a rope guide block of the type used in the hoist illustrated in FIGS. 1 and 2;

FIG. 4 is a front view of an improved hoist in accordance with this invention;

FIG. 4A is a top plan view of a lower rope guide block of the type attached to the hoist shown in FIG. 4;

FIG. 4B is an end view of the rope guide block shown in FIG. 4A;

FIG. 18 is a side view of a handled ascender in accordance with this invention; and FIG. 19 is an end view of the handled ascender illustrated in FIG. 18.

DETAILED DESCRIPTION OF THE DRAWINGS

Figure 5A:
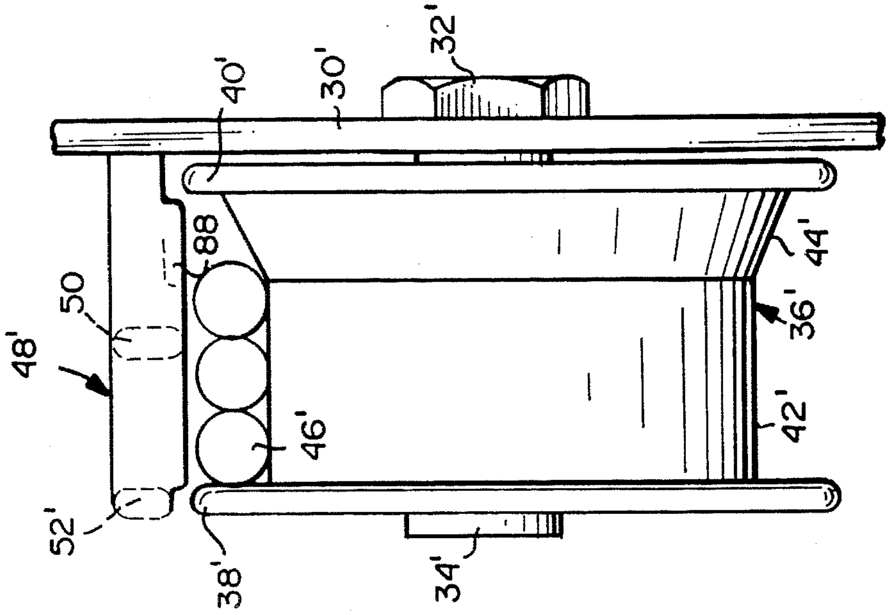
FIG. 5A is a partial side view of an alternative hoist in accordance with this invention.

Referring to FIG. 1, there is shown a conventional hoist of the type disclosed in U.S. Pat. No. 3,807,696. The hoist includes a carrier bracket or plate 1 to which is attached at one end thereof a bolt 2, the free end of which may be covered by a cap 2'. A cylindrical rope drum 3 having end flanges 4 and 5 is rotatably supported on the bolt by means of a free wheeling roller locking friction clutch which permits free wheeling rotation of the rope drum in one direction, but which blocks the rotation of the rope drum in the opposite direction. Thus, the rope drum 3 is rotatable in the direction of the arrow A and locked against rotation in the direction of the arrow B. These roller locking friction clutches or so called free wheeling bearings are known per se and need not be described in further detail.

A rope 6 is wound around the circumference of the rope drum 3 between the flanges 4 and 5. Generally, at least one and one half turns of rope are wound around the drum; however, two and one half turns are common. In the following-text the rope end 6' shall be referred to as the load end, whereas the rope end 6" shall be referred to as the control end of the rope 6. Since the drum 3 is rotatable in the direction of the arrow A, the rope end 6' which is formed into a bight 7 may be easily lifted by pulling the rope end 6" downwardly. In this operation, the rope drum 3 rotates in the direction of the arrow A.

If, however, a person and/or a load is connected to the bight 7 of the load end 6' the rope 6 will be subjected to a downwardly directed force K'. This force K' can be effectively controlled or balanced by a substantially smaller force K" applied to the control end 6", as explained in the '696 patent.

The known hoist also includes an arcuate rope guide which is formed by two curved legs 8 and 9 and at least one connecting bight member, and preferably two connecting bight members 10 and 11. The legs 8 and 9 are bent in such a manner that they conform substantially to a portion of the circumference of the rope drum 3 but without interfering with the rotation of the drum- The legs 8 and 9 and the connecting bights 10 and 11 thus form a longitudinal closed loop or opening 12 which is bent along a portion of the circumference of the rope drum 3, thus forming a guide bail for the rope as it winds onto the drum. The guide bail is secured to the bracket 1 by means of two bolts 13 and 14 which may, for example, be welded to the bail or loop.

The bracket 1 is provided with a hole 15 for connecting the bracket to a fixed point of support. The hole 15 preferably lies in a plane which extends perpendicularly to the bracket and longitudinally and centrally through the rotational axis of the rope drum 3. The bracket is provided with a further hole 16 which is somewhat laterally displaced relative to the hole 15 for the purpose of attaching a load to the bracket in certain uses of the device.

A lower rope guide block 17 is also provided which has an outer end extending toward the surface of the rope drum without interfering with the rotation of the rope drum. The block 17 also has a bracket facing end which is rigidly secured to the bracket 1, for example, by bolts.

Referring to FIG. 2, there is shown a side view of the hoist according to FIG. 1 and illustrating the rope guide block 17.

The guide bail 10 in FIG. 2 is shown in dashed lines only in order not to obscure the illustration of the rope guide block 17. The guide block 17 comprises a bridging member 19 and two side members 20 and 21 extending laterally away from the bridging member toward the cylindrical surface of the rope drum. The bridging member has an extension 22 facing toward the bracket 1. The extension is provided with threaded bores (one shown at 23) for securing the guide block 17 to the bracket 1 by means of bolts (one shown at 24).

Referring now to FIG. 3, the inwardly facing surfaces 25 and 26 of the side members 20 and 21 of the guide block 17 are slanted to correspond to the slanting of the rope turns around the drum.

The inner surfaces 25 and 26 and the inwardly facing surface 27 of the bridge member 21 form a rope guide chamber in cooperation with the cylindrical surface 18 of the rope drum. The inner surfaces 25 and 26 are said to prevent undesirable shifting of the rope turns during both raising and lowering operations.

Turning now to FIG. 4, a hoist incorporating the improvements of this invention is illustrated. As in the conventional hoist arrangement, a carrier bracket or back plate 30 having a mounting hole 31 is provided to which is attached at one end thereof a bolt 32 or 32' (see FIGS. 5 and 5A), the opposite and free end of which may be covered by a cap 34. An improved tapered roller drum 36 having end flanges 38 and 40 is rotatably supported on the bolt by means of a free wheeling roller locking friction clutch which permits the free rolling rotation of the rope drum 36 in one direction but which blocks rotation of the drum 36 in the opposite direction. Thus, as viewed in FIG. 4, the drum 36 is rotatable in the direction of arrow A and locked against rotation in the direction of arrow B. As already noted, the free wheeling roller locking friction clutch is similar to those used in conventional hoist systems and therefore need not be described in further detail herein.

Figure 5:
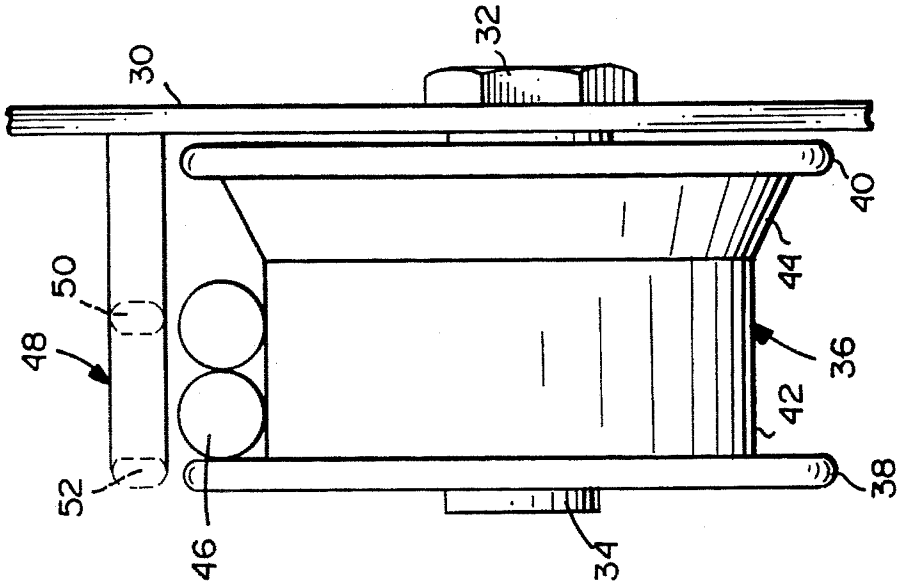
FIG. 5 is a partial side view of the hoist illustrated in FIG. 4.

As best seen in FIG. 5, the drum 36 in accordance with this invention has a substantially cylindrical surface portion 42 and a conical or tapered surface portion 44, the latter flaring radially outwardly in a rearward direction from the cylindrical surface 42 to the end flange 40 closest to the plate 30.

A rope 46, which in this case is a rope having a diameter of approximately ½ inch, is wound around the circumference of the rope drum 36 and specifically on the cylindrical portion 42 thereof.

During a raising operation, the tapered surface 44 forces the rope 46 as it comes on to the drum 36 to slide off the tapered surface 44 toward the front of the drum, thus clearing a space for new rope to come onto the rear of the drum 36. It has been found that the tapered configuration works more effectively with increased loads, but also very well with smaller loads down to about ten pounds. The tapered surface is less effective when simply retrieving the rope with no load, however, and it is therefore preferred to utilize a lower rope guide (described below) to prevent overlapping under a no load raising situation.

Figure 6:
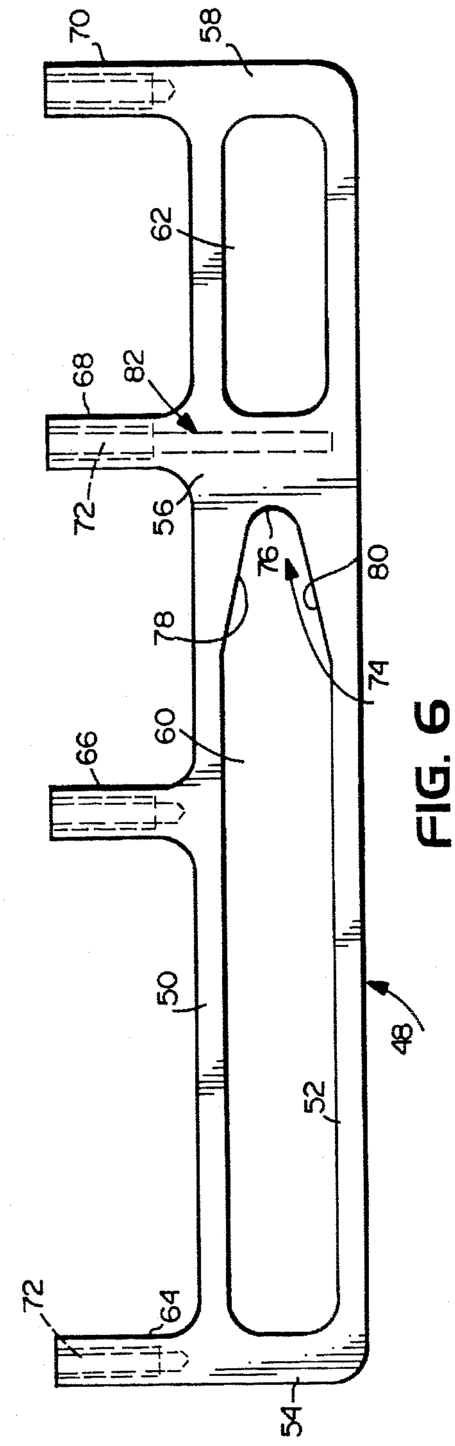
FIG. 6 is a plan view of an arcuate rope guide cage of the type shown in FIG. 4, but straightened to a linear form.
Figure 8:
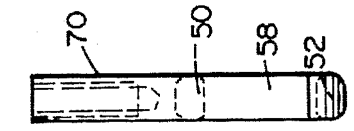
FIG. 8 is an end view of the rope guide cage illustrated in FIG. 6.
Figure 7:
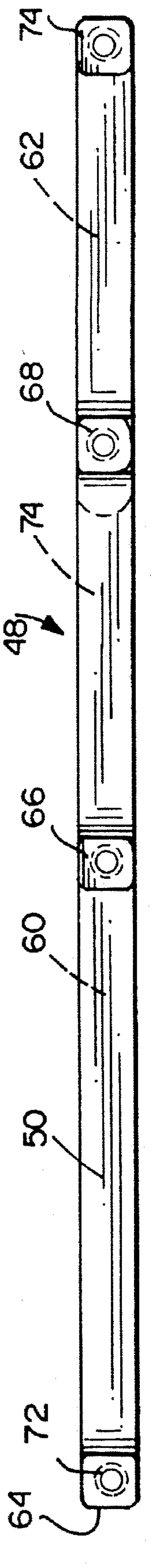
FIG. 7 is a front view of the rope guide cage illustrated in FIG. 6.

With reference now to FIGS. 4 through 8A, an improved rope guide cage 48 (preferably of stainless steel construction) is illustrated and which is intended to be utilized when rope of approximately ½ inch diameter is employed with the hoist. As apparent from FIG. 4, the rope guide cage 48 is arcuate in shape, but for purposes of clarity and convenience, the rope guide cage 48 is shown in FIGS. 6, 7 and 8 in linear or planar form. Thus, the rope guide cage 48 includes a pair of substantially parallel legs 50 and 52 which are spaced from each other by bight portions 54, 56 and 58. As a result, a pair of slot-like openings 60 and 62 are formed, one adjacent the other, in the elongated direction of the rope guide cage. The rope guide cage 48 is also provided with four mounting legs 64, 66, 68 and 70 spaced from each other in the longitudinal direction of the rope guide cage, and extending substantially perpendicular to the legs 50, 52. Each of the mounting legs is formed with a threaded blind bore 72 to facilitate attachment of the rope guide cage to the back plate 30 by means of screw fasteners (not shown) extending through the back plate 30 and into the threaded blind bores 72.

The opening or slot 60 is formed with a wedge groove 74 at one end thereof (adjacent the second opening 62) including a base portion 76 and a pair of tapered wedge surfaces 78, 80.

With the rope guide cage 48 bent to the appropriate arcuate form, it may be seen that the cage extends over approximately 210° of the circumference of the roller drum 36, and crosses over a vertical center line "L" through the aligned mounting hole 31 on the backplate 30 and the axis of rotation "R" of the drum 48.

In one exemplary use of the device illustrated in FIG. 4, the rope 46 passes through the rope slot 60 and winds about the cylindrical surface portion 42 of the roller drum 1½ or 2½ times before exiting the hoist substantially vertically downwardly. It will be appreciated that the control end of the rope may enter the slot 60 from various directions from straight down to straight up, i.e., anywhere from about a 6 o'clock to a 3 o'clock position as viewed in FIG. 4, depending on the particular use of the hoist. As may be seen from FIG. 5, the leg portions 50, 52 (as well as 64, 66, 68, 70 and 54, 56, 58—see FIGS. 6 and 7) are located closely adjacent the drum surface 42 (about ½ inch for a ⅜ inch diameter rope and about ⅝ inch for a ½ inch diameter rope) thereby decreasing the space between the rope 46 riding on the roller drum 36 and the rope guide 48 so that the rope turns cannot overlap. In addition, the extended circumferential length (at least about 210° ) of the rope guide 48 and its closer location to the end flange 38 (about ⅛ inch) prevents the rope from slipping between the rope guide 48 and the end flange 38 of the drum 36.

As indicated above, the arcuate rope guide cage 48 is intended for use with ½ inch diameter rope. This rope is designed for a maximum working load of 600 pounds (a two person load). It has been found that conventional systems do not generate sufficient friction to control descent, particularly in a maximum load situation. By configuring the rope slot 60 to include the wedge groove 74, it will be appreciated that, under loading and with the control end entering slot 60 anywhere from a horizontal (9 o'clock) to vertical 3 o'clock) orientation (as viewed in FIG. 4), the rope 46 will wedge itself into the wedge groove 74 (which lies to the left of and immediately adjacent, leg 68 in FIG. 4) producing additional friction and thereby providing greater control of descent for a two person load.

In addition, it is the Case that 1½ windings or turns are ideal for lifting operations (with pulleys) when using a ½ inch diameter rope. However, in a 1 to 1 arrangement (without pulleys), 1½ windings do not create sufficient friction in a lowering operation. If 2½ windings or turns are employed with the ½ inch diameter rope, too much friction is generated. The wedge groove 74 is particularly advantageous in that it generates the desired friction with 1½ windings or turns.

Moreover, in systems which allow down rigging to a one-to-one configuration (i.e., with no additional pulleys), the full load is seen on the roller drum 36 and a high counter force is required at the control end of the rope to hold the load stationary or to effectively control descent, unlike a two-to-one or three-to-one lifting advantage configuration where only ½ or ⅓, respectively, of the load is seen on the roller drum. The wedge shaped groove 74 allows precise control of descent speed as it allows the operator to fine tune the friction generated by bending the rope 46 more or less around the wedge, i.e., the friction generated increases as the control end of the rope is moved toward the 12 o'clock position. It will be appreciated, however, that the wedge groove 74 generates no additional friction when the control end of the rope enters the slot 60 between about the 6 o'clock and 9 o'clock positions (such as when hauling on the rope).

It is another feature of the invention that the rope guide cage 48 may incorporate a wear indicator 82 in the bight portion 56 between the wedge groove slot 74 and the adjacent slot 62. The wear indicator 82 may be in the form of a thin colored plastic rod which is inserted into the rope guide cage 48 through an extension of the threaded blind bore 72 in the mounting leg 68. The indicator 82 will become visible should the wedge groove 74 become sufficiently worn from rope friction/abrasion, thus alerting the user that the rope guide cage 48 should be replaced.

Figure 6A:
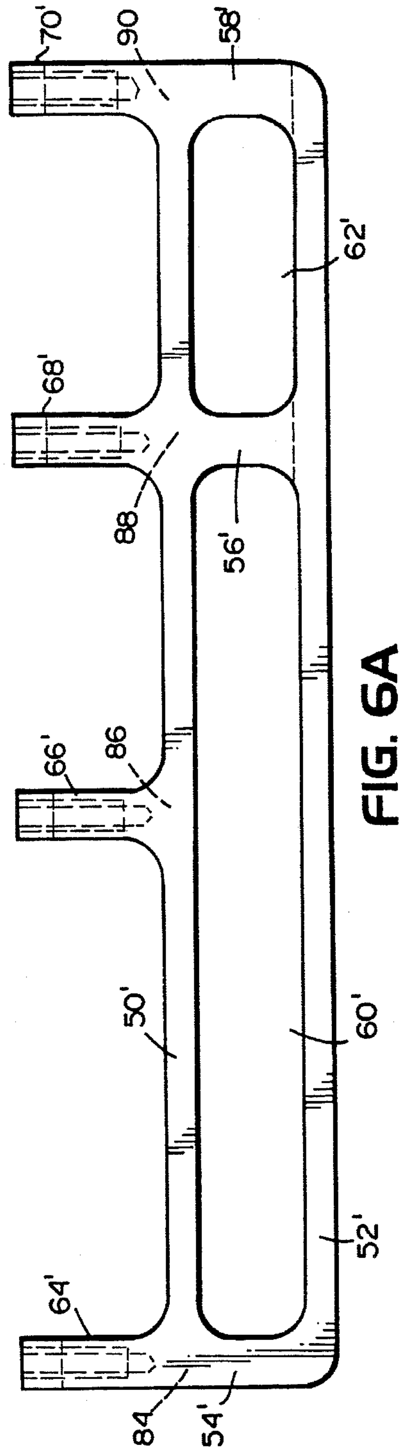
FIG. 6A is a top plan view of an arcuate rope guide cage in accordance with an alternative embodiment of the invention, also straightened to a linear form.
Figure 8A:
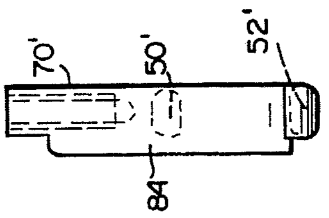
FIG. 8A is an end view of the rope guide cage illustrated in FIG. 6A.
Figure 7A:
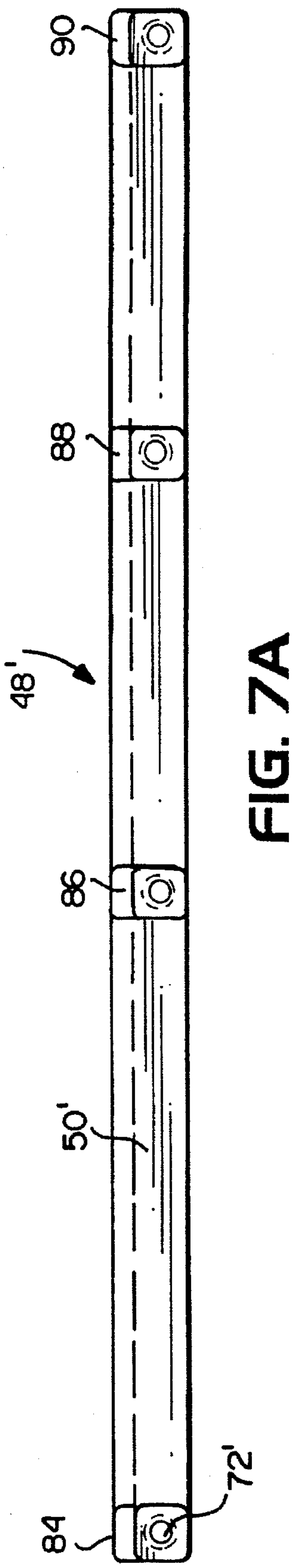
FIG. 7A is a front view of the rope guide cage illustrated in FIG. 6A.

With reference now to FIGS. 6A, 7A and 8A, an alternative rope guide cage 48' is illustrated. For convenience, the same reference numerals are used as in FIGS. 6, 7, and 8 to denote common elements, but with "prime" designations added. This alternative design is intended for use with rope of ⅜ inch diameter. The ⅜ inch diameter rope is designed for a maximum working load of 300 pounds (a one person load) and the rope is normally wrapped 2½ times about the circumference of the drum. With this lighter loading, sufficient friction is generated by the 2½ turns about the drum that the descent of the one person load can be controlled precisely, and no wedge groove of the type shown at 74 in FIG. 6 is recruited. On the other hand, the smaller diameter rope would otherwise result in increased space between the rope 46 and the rope guide cage 48, raising the possibility of the rope overlapping itself. As a result, in this alternative embodiment, a plurality of lugs 84, 86, 88 and 90 have been incorporated into the rope guide cage, extending along the mounting leg portions 64', 66', 68' and 70' as well as across the bight portions 54', 56' and 58' and along the leg 50. As best seen in FIG. 5A, these added lugs effectively decrease the radial distance between the rope 46' and the rope guide cage 48' to thereby eliminate the possibility of the smaller diameter rope overlapping itself.

Returning to FIG. 4, a lower rope guide block 92 is mounted on the backplate 30 generally below the drum 36. The guide block 92 in accordance with this invention improves upon the guide block 17 described here and above with respect to the disclosure in the '696 patent, by combining the lower guide block with an angled rope guide slot in a one piece construction. In the hoist device as disclosed in the '696 patent, a separate angled eye bolt is utilized to guide the rope as it unwinds from the drum and this eye bolt, although not visible in FIGS. 1 and 2, is typically located adjacent to the guide block 17 on the right hand side of the drum (as viewed in FIG. 1) with the load end 6' of the rope 6 passing therethrough. In accordance with this invention, the improved lower guide block 92 (best seen in FIGS. 4A and 4B) includes a base portion 94 which includes a pair of upright portions 96, 98 which extend away from the base portion 94 toward the cylindrical rope engaging surface 42 of the drum 36. These upright portions function much in the same manner as the side members 22 and 23 of the guide block 17 as described in the '696 patent add hereinabove. In accordance with this invention, however, it will be noted that the base portion 94 is provided with increased thickness in the area 94' between the upright portions 96 and 98 in order to provide; more appropriate spacing for a ⅜ inch diameter rope.

The base portion 94 also extends in an opposite direction toward the right hand side of the backplate 30 as viewed in FIG. 4, at which end there is provided an angled rope guide slot 100 which is located so as to enable the load end of rope 46 to pass therethrough in a generally downwardly vertical direction as it exits the rope drum 36. Slot 100 is angled to accommodate the rope movement on the tapered drum. The rope guide block 92 may be secured to the backplate 30 by means of fasteners (not shown) extending from behind the backplate 30 and into a plurality of tapped blind holes 102 provided along the rear edge of the guide block 92.

It will be appreciated for a rope of ½ inch diameter, the rope guide block may be of substantially similar construction as that described above, with the exception that the angled rope slot may be enlarged and the thickness of the base portion 94 may remain uniform (as shown at 94 in FIG. 4B) across the length of the guide block. Guide block 92, like the rope guide cage 48, is preferably constructed of stainless steel.

Figure 9:
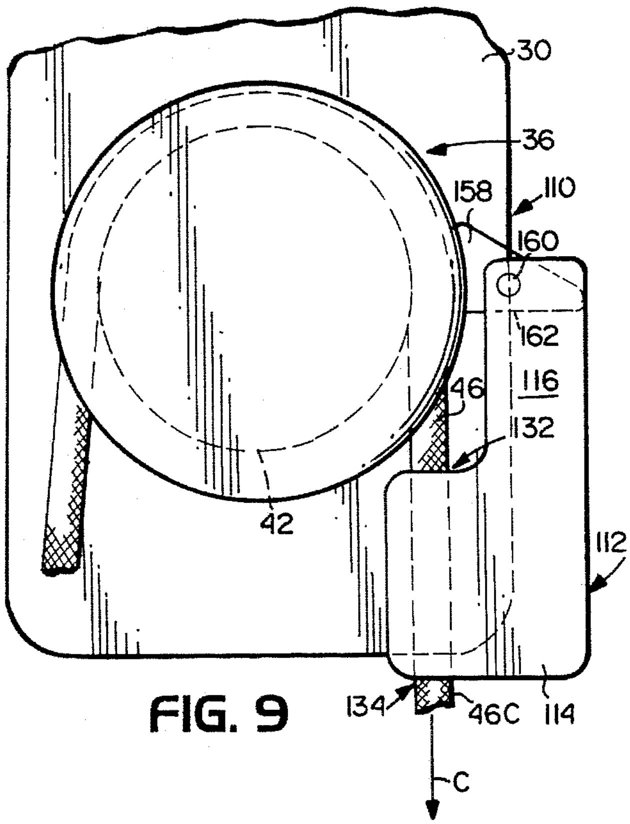
FIG. 9 is a partial front view of a hoist and centrifugal brake assembly in accordance with the invention.

Turning now to FIGS. 9–14, a centrifugal brake assembly 110 is adapted for optional attachment to the backplate 30 under appropriate conditions (i.e., where automatic fall arresting is required by law). Specifically, the brake 110 is adapted to be secured to the backplate to one side of the drum 36 so that the rope 46 will pass through the brake mechanism 110 as it leaves the drum, and without change of direction, as best seen in FIG. 9.

Figure 10:
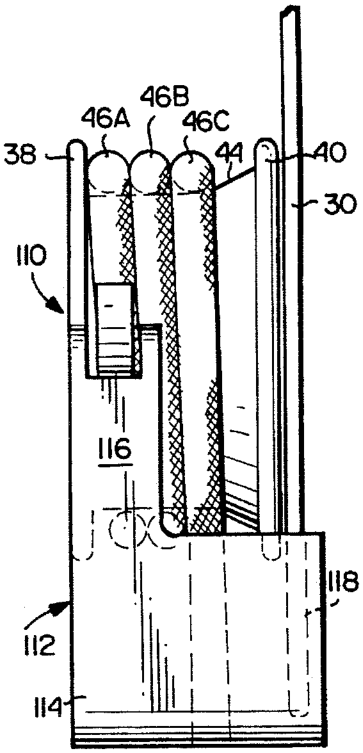
FIG. 10 is an end view of the assembly illustrated in FIG. 9.
Figure 12:
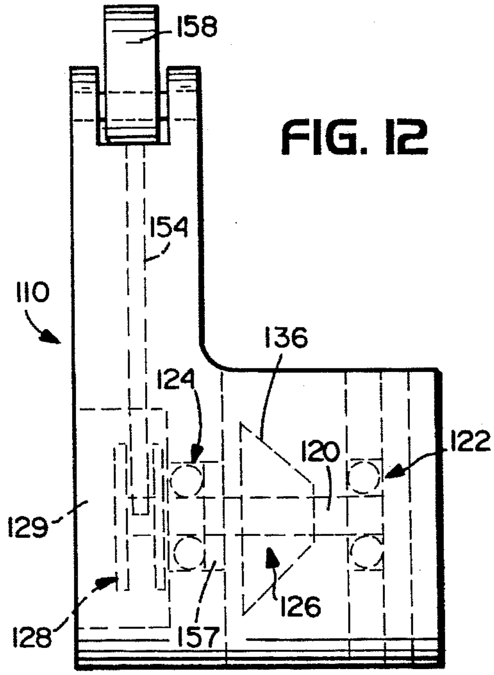
FIG. 12 is an enlarged side view of the centrifugal brake illustrated in FIG. 10 with internal components shown in phantom.

The brake assembly 110 includes a housing 112 which has a substantially L-shaped profile when viewed from one side as in FIGS. 10 and 12, and a substantially reverse L-shaped (or J-shaped) profile when viewed from the front as in FIGS. 9 and Thus, the housing 112 includes a base portion 114 and an upper portion 116. The base portion 114 is provided along its rear edge with an elongated mounting slot 118 (FIG. 13) which is adapted to receive the backplate 30 (as best seen in FIG. 10) and to be secured thereto by suitable fasteners.

The base portion 114 mounts a shaft 120 journalled in a pair of sealed ball bearing assemblies 122 and 124. A tapered rope wheel 126 is fixed to the shaft intermediate the bearing assemblies 122, 124, while the end of the shaft which passes through the bearing assembly 124 mounts a centrifugal brake disk 128 located in a circular, sealed chamber 129 (which will be closed to the outside by an end cover plate (not shown). Thus, it will be appreciated that the rope wheel 126, shaft 120 and centrifugal brake disk 128 all rotate together, and that the disk 128 is isolated from the rope wheel 126.

Figure 13:
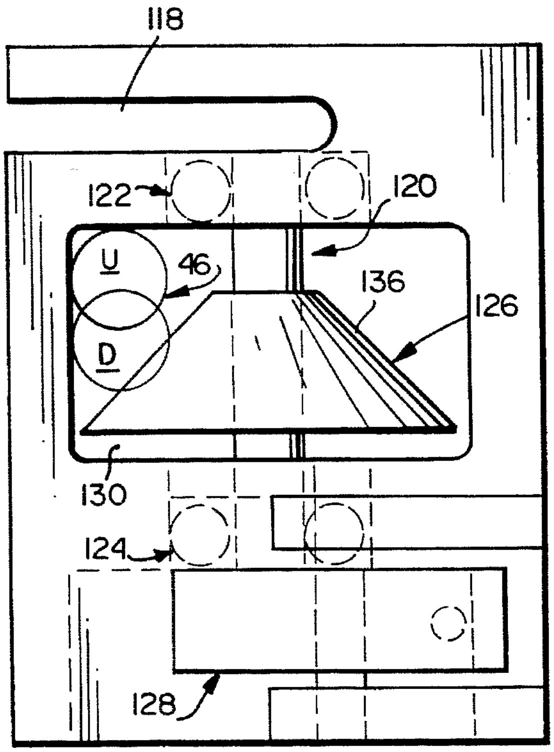
FIG. 13 is a partial top plan view of the centrifugal brake illustrated in FIG. 11.

The base portion 114 of the housing 112 is formed with a rectangular through slot or opening 130 (FIG. 13) which extends vertically through the housing and allows the rope 46 to enter the slot at 132, and exit the slot at 134, as best seen in FIG. 9. With particular reference to FIG. 13, it will be seen that the rope 46 passes through the slot to one side of the shaft 120 and, as explained further below, will engage the tapered surface 136 of the tapered rope wheel 126 when the rope end 46 is travelling downwardly (denoted by D in FIG. 13), but will not engage the tapered surface 136 when the rope is travelling upwardly (denoted by U in FIG. 13).

Figure 15:
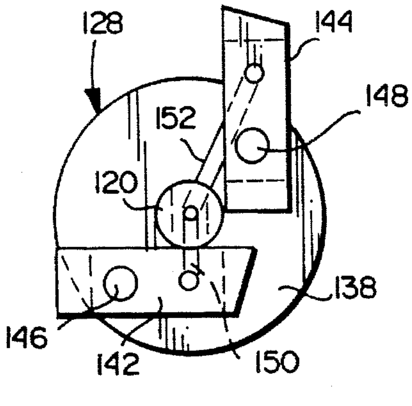
FIG. 15 is an enlarged side view of the centrifugal disk and shaft illustrated in FIG. 14.
Figure 14:
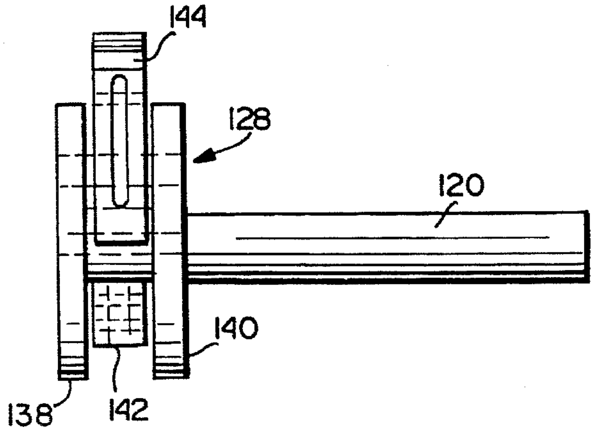
FIG. 14 is an enlarged detail of a centrifugal disk and shaft extracted from the centrifugal brake shown in FIGS. 9–13.

With reference now particularly to FIGS. 14 and 15, the centrifugal disk 128 includes a pair of circular plates 138 and 140 laterally spaced from each other along the shaft 120. A pair of pawls 142 and 144, are pivotally secured between the plates by pins 146, 148, respectively. The pawls 142 and 144 are held in a retracted position substantially between the plates 138, 140 by a pair of springs 150 and 152, respectively, which extend between the pawls and the shaft 120 as best seen in FIG. 15. As the speed of the disk 128 increases (in the counterclockwise direction as viewed in FIG. 15—as occurs during a lowering operation as viewed in FIG. 9) to a predetermined level, the pawls 142 and 144 will swing radially outwardly, against the biasing action of springs 150 and 152 to an extended position as illustrated by pawl 144 in FIG. 15.

Figure 11:
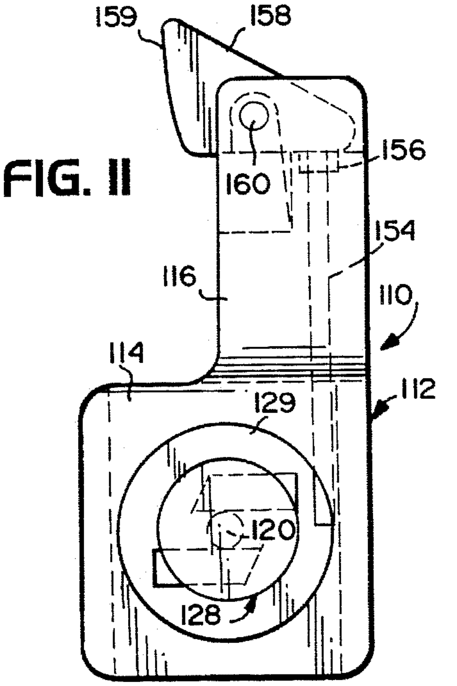
FIG. 11 is an enlarged front view of the centrifugal brake mechanism as shown in FIG. 9 and illustrating some of the internal components thereof.

With reference now to FIGS. 11 and 12, a connecting rod 154 extends vertically upwardly from the sealed chamber 129 in the base portion 114 of the housing 112 and though a vertically extending bore which opens at the upper end of the upper portion 116. The bore is fitted with a seal 156 and the shaft 120 is fitted with a seal 157 which serve to prevent dirt, dust or moisture from entering into the sealed chamber 129 and which otherwise might interfere with proper operation of the pawls. In other words, the design of the centrifugal brake mechanism in accordance with this invention separates the area where the rope passes through the device from the area where the centrifugal disk/pawls are located.

At the uppermost end of the upper portion 116 of housing 112, there is a wedge-shaped rope cam 158 secured by a pin 160 for rotation toward or away from a rope unwinding from the drum as bed seen in FIG. 9. A conventional torsion spring (not shown) is utilized to hold the cam 158 away from the rope 46, i.e., biased in a clockwise direction as viewed in Figs. 9 and 11. From the same Figures, it will also be appreciated that the upper end of the connecting rod 154 may extend out of the housing to engage a surface 162 of the cam 158 as described below.

In use, the centrifugal brake assembly 110 may be secured to the back plate 30 by means of the mounting slot 118 formed in the housing 112, along with suitable fasteners, with the brake assembly oriented as shown in FIGS. 9 and 10. The rope 46 exits the drum 36 and passes through the slot 130 of the brake assembly, with a load attached to that end of the rope.

With the rope 46 wound 2½ times (turns 46A, 46B, and 46C) about the drum (see FIG. 10), it may be seen that the rope cam 158 of the brake assembly is aligned with the first winding 46A of the rope on the drum while the third winding 46C exits the drum to pass through the slot 130.

During a lowering operation, with rope turn 46C travelling downwardly through the slot 130 in the direction indicated by arrow C in FIG. 9, the rope portion 46C will contact surface 136 of the tapered wheel 126 as the rope naturally shifts forwardly (to the left in FIG. 10) on the drum 36. This ensures that during lowering, the rope 46 is always in contact with the tapered rope wheel 126, causing the latter to spin as lowering proceeds.

Once the wheel 126 reaches a predetermined rotational speed, the pawls 142 and 144 will swing radially outwardly, and one will engage the lower end of the connecting rod 154. Note in this regard that only one pawl need contact the connecting rod. The use of a second or backup pawl is for safety, so that in the event one pawl fails, the other will serve to brake the rope.

Upon engagement of one of the pawls 142 or 144 with the lower end of the connecting rod 154, continued rotation of the rope wheel will drive the connecting rod 154 upwardly to engage and pivot the rope cam 158 in a counterclockwise direction (as viewed in FIGS. 9 and 11) to sandwich the rope winding 46A between surface 159 of the cam 158 and the roller drum surface 42, stopping further movement of the rope. Once activated, the shape of the surface 159 and the location of pivot 160 insures that the rope cam 158 will remain wedged into engagement with the rope and the load on the system remains stationary.

In order to disengage the rope cam 158, the operator must simply raise the load slightly to simultaneously pull the rope cam 158 upwardly in a clockwise direction, thereby releasing the rope, and allowing the torsion spring to return the rope cam 158 to its normal, disengaged position. Normal operation may then be resumed and the brake 110 automatically reset and ready for re-activation when required.

The tapered rope wheel 126 takes advantage of the natural operation of this type of system which causes the rope 46 on the roller drum 36 to move toward the rear of the drum when raising and toward the front of the drum when lowering. When raising, it is advantageous to have as little friction as possible so as to reduce the force required to raise a given load or weight. Thus, as the rope 46 moves towards the rear of the drum 36, it no longer contacts the tapered rope wheel 126 (see rope section U in FIG. 13). As explained above, however, during a lowering operation, it is crucial to have the rope firmly pressed against the tapered rope wheel in order to insure that no slippage occurs and that the rotational speed of the tapered rope wheel accurately matches the vertical descent speed of the rope. As explained above, since the rope coming off the roller drum during lowering shifts forward on the drum, it moves into direct contact with the tapered rope wheel See rope section D in FIG. 13). To further insure that no slippage occurs between the rope 46 and the tapered rope wheel 126, grooves (not shown) may be formed within the tapered rope wheel surface in order to increase friction between it and the rope.

It is also significant that the rope windings all move at the same speed, and that the tapered roller wheel 126 engages the winding 46C of the drum as it exits the drum to thereby accurately sense the descent speed of the rope, while the rope cam 158 is aligned with the initial winding 46A of the rope on the drum 36. This arrangement results in a considerable reduction in the amount of force which must be applied by the cam 158 to the rope in order to stop further downward movement of the load. In other words, if the cam were to try and stop the rope as it comes off the roller drum, it would be subjected to the pull load on that line. This would be unacceptable since it is likely that either the rope would break, or damage would occur to the device itself from the excessive shock loading. Accordingly, the design in accordance with this invention locates the rope cam 158 to grab the rope where the rope comes on to the drum and the load is considerably lower. As discussed above, this reduction is achieved because of the friction produced between the rope and roller drum which increases progressively toward the front of the roller drum to the extent that much less force is required to stop the descent (approximately 10% of the load on the rope coming off the drum) if the rope is engaged at the front of the drum, i.e., turn 46A, as described herein above. A slight cushioning effect is also achieved in that upon stopping movement of the rope winding 46A, further tightening of the rope turns 46B and 46C about the drum, along with some slight stretching of the rope, will occur before the rope winding 46C is also brought to a halt.

It will be appreciated that for those applications where the centrifugal brake assembly 110 is utilized, the lower rope guide block 92 maybe removed from the backplate 30 and replaced with another block which includes only the left hand portion of the illustrated block 92.

While the above described centrifugal brake mechanism has been described in conjunction with a hoist used as part of a rescue apparatus, it will be appreciated that it may have equal applicability to any situation where it is desired to stop a loaded rope coming off a drum.

Another problem with existing rescue systems which utilize a hoist of the type described, for example, in the '696 patent, is that when using the system for certain types of work or rescue, i.e., involving entry into confined spaces such as manholes, underground electrical vaults, tanks, etc., the person connected to the system inevitably will twist the ropes by turning around naturally as he performs his work. The problem arises in that if an emergency rescue (requiring raising of a load) must be performed, the twisting of the ropes causes large amounts of friction to occur and, depending upon the degree of twist, may render the operator incapable of raising as the force required will be simply too great.

Figure 16:
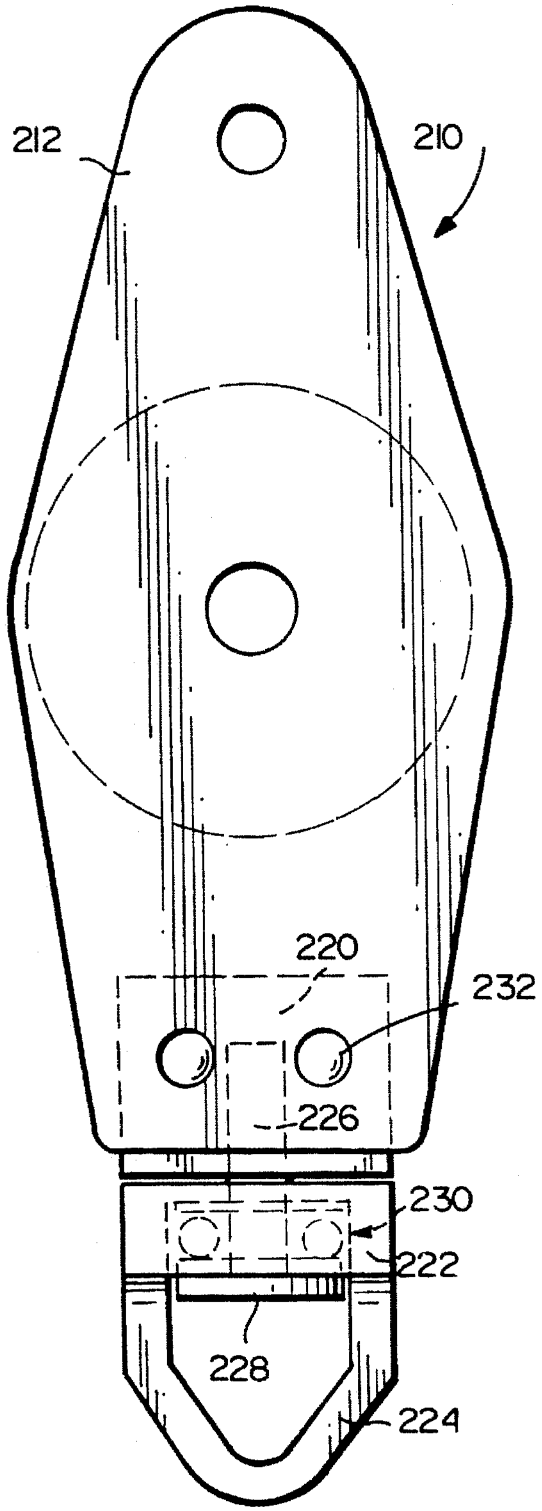
FIG. 16 is a front view of a swivel pulley in accordance with this invention.
Figure 17:
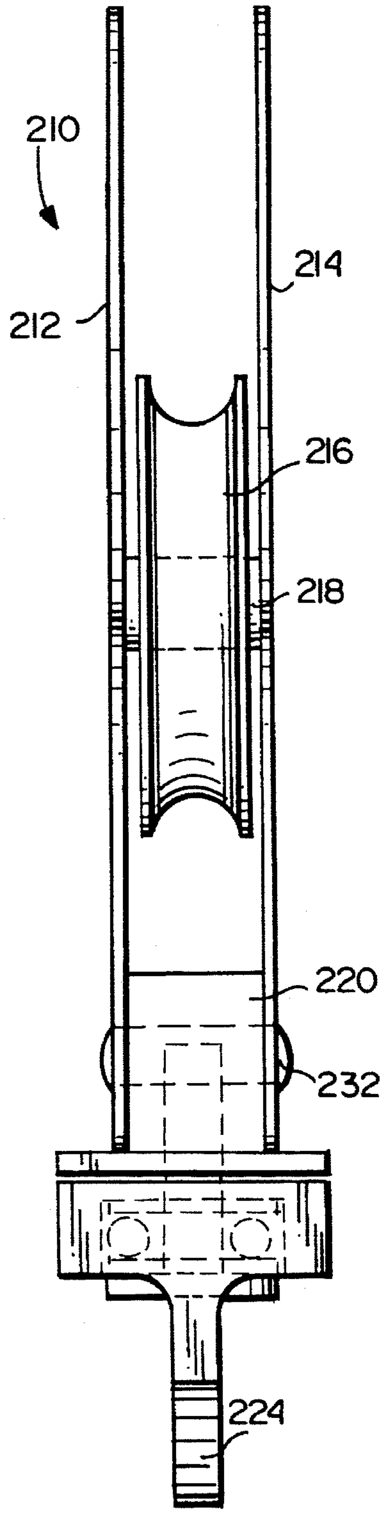
FIG. 17 is a side view of the swivel pulley illustrated in FIG. 16.

It is thus another feature of this invention to utilize one or more swivel pulleys which allows the person connected to the rescue system to move and rotate without twisting the ropes. With reference now to FIGS. 16 and 17, the swivel pulley 210 in accordance with this invention comprises a pair of conventional plates 212, 214 with a pulley sheave 216 mounted therebetween by means of a pin (axle) or the like.

At the lower end of the plates 212, 214, an upper swivel block 220 is fastened between the plates 212, 214. The upper swivel block 220 is sandwiched or clamped between lower ends of the plates and extends beyond the bottom edges of the plates. A lower swivel block 222 incorporating a closed loop 224 is secured to the upper swivel block by means of a connector bolt 226. The bolt 226 includes an enlarged head 228 to which is secured a thrust ball bearing assembly 230. It will be appreciated by those of ordinary skill in the art that with this arrangement, the upper swivel block 220 (secured between the plates 212 and 214 by suitable fasteners such as rivets 232) remains stationary while the lower swivel block 222 and the closed loop 224 may freely rotate about the connector bolt by means of the ball bearing assembly 230.

Thus, the above described swivel pulley will solve the twisting problem by allowing the person connected to the system to move and turn without twisting the ropes. In this regard, the lower part of the swivel, i.e., lower swivel block 222 is connected via a conventional carabiner (and closed loop 224) to the person while the pulley plates 212, 214 are connected to the hoist mechanism via a rope wound about the sheave 216.

Another component for use in the rescue system of this invention relates to handled ascenders conventionally used in mountain climbing as a tool permitting the user to ascend an otherwise stationary rope. Such ascenders also have applicability in rescue systems. By way of example, the ascender may be utilized by a person in a stationary position pulling downwardly on a control end rope to raise a person on the other or load end of the rope. As already noted, there are problems with known handled ascenders which effectively render them non-usable in certain situations, particularly in cold weather environment where the operator is wearing bulky gloves or mitts.

Turning to FIGS. 18 and 19, a new handled ascender 310 in accordance with the present invention is illustrated.

Specifically, the handled ascender 310 includes a vertically arranged handle body or post 312 formed with upper and lower portions 314, 315, respectively which extend substantially perpendicularly away from the handle body 312. The device is shown sideways in FIG. 18. In a normal use situation, however, it will be appreciated that the device would be grasped by handle body 312 in a substantially vertical orientation. In plan, the upper portion 314 includes a reverse J-shaped portion 316 (best seen in FIG. 19) which forms a rope passageway 318 through which a rope may pass in a direction substantially parallel to the handle body portion 312.

The upper portion 314 is bifurcated in the area behind the space 318 and above the handle body 312 to provide a slot 319 in which a cam lever 320 is pivotally secured by means of a pin 322. The cam lever 320 has a forward rope engaging surface 324 which is located relative to an interior surface 328 of the reverse J-shaped portion 316 so as to permit the rope to pass through the passageway 318 without interference from the cam. In this regard, the cam 320 is provided with a conventional torsion spring at the pivot pin 322 to maintain the cam 320 in a "rope contact" position (the cam is shown in an extended or locking position in FIGS. 18 and 19). The cam 320 is also provided with an actuating lever portion 330 which enables the user to disengage the cam lever 320 from the rope as further described below. By having the activating lever extend rearwardly away from the handle body 312, it will be appreciated that a left or right handed user of the device can easily actuate the rope cam 320 by pressing on the actuating lever 330 with the thumb without interference from any other portion of the device even when wearing a bulky glove or mitt.

The lower portion 315 of the handle body or post 312 is formed with a carabiner attachment hole 332 in an offset portion 334. The latter is offset from one side of the handle body 312 so as not to interfere with the rope extending through the passageway 318.

The lower portion 315 may also be provided with a transversely extending (perpendicular to both the post or handle body 312 and the upper and lower portions 314, 315) handle grip 336. The handle grip 336 is secured to the lower portion 315 of the handle body 312 by means of a threaded stud 338 which extends through the device and which is provided with an enlarged thumb nut 340 at one end thereof. The utilization of handle grips 336 permits two-handed operation of the ascender for greater pulling power. It will be appreciated that by removing the threaded stud 338, the handle grip 336 may be moved to the other side of the handle to convert the ascender from a left-hand to right-hand version or vice versa.

The incorporation of the open handle body 312 as opposed to the conventional closed loop design, allows even the largest mitted hands to easily hold and operate the ascender. As already noted since the cam actuator 330 protrudes from the rear of the ascender, it can be operated with equal ease by a left or right-handed person even with large bulky gloves or mitts.

It will be appreciated that the handled ascender as described herein is not limited to use with rescue apparatus but has equal applicability to all known uses of conventional ascenders including mountain climbing and virtually any situation which requires handling on a rope.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brake for use with a hoist device which includes a drum having at least one and one half windings of rope thereon, with a control end of the rope on one side of the device and a load end of the rope on the other side of the device, the brake comprising a rope speed sensing means engaging said rope as it unwinds from the drum, and a rope braking means for engaging a first of said at least one and one half windings of said rope as said rope winds onto said drum and for sandwiching said first winding between said rope braking means and said drum.

2. The brake of claim 1 wherein rope braking means includes a rotatable disc having at least one brake actuator pivotally secured thereto, a brake element for engaging the rope and a connector rod between the brake actuator and brake element, wherein said brake actuator is calibrated to pivot into engagement with said connector rod in response to centrifugal forces created by rotation of said disc.

3. The brake of claim 2 wherein said rope sensing means comprises a rotatable rope wheel adapted to engage said rope as the rope unwinds from the drum, said rope wheel mounted on one end of a shaft, and said rotatable disc mounted on the other end of said shaft.

4. The brake of claim 2 wherein said at least one brake actuator comprises a pawl pivotally mounted to said disc, and movable between retracted and extended position, said pawl adapted to engage said connector rod when in said extended position.

5. The brake of claim 4 wherein said pawl is spring biased to the retracted position.

6. The brake of claim 2 wherein said brake element is mounted for pivotal movement about an axis extending parallel to the axes of rotation of said rope wheel and said rotatable disc.

7. A speed responsive brake for use with a drum having a plurality of forms of rope wound thereon, with a load end of the rope adapted to come off the drum, the brake comprising:

- a housing including a passageway for receiving the load end of the rope as it comes off the drum;
- a speed sensing element mounted in said housing and arranged in said passageway for engaging the load and of the rope when said load end comes off the drum from a final turn thereon and in a direction away from the drum;
- a braking element mounted in said housing in laterally offset relationship to said speed sensing element such that said braking element is positioned to engage a turn of the rope on the drum upstream of the load end of the rope and to sandwich said turn of the rope between said braking element and said drum; wherein said breaking element is operable in response to rope speed sensed by said speed sensing element.

8. The speed responsive brake of claim 7 wherein said breaking element is operationally connected to a brake element actuator.

9. The speed responsive brake of claim 8 wherein said brake element actuator and said speed sensing element are fixedly secured on a common shaft for rotation therewith.

10. The speed responsive brake of claim 9 wherein said brake element actuator is isolated from said speed sensing element.

11. The speed responsive brake of claim 9 wherein said speed sensing element comprises a wheel having a rope engaging surface.

12. The speed responsive brake of claim 11 wherein said brake element actuator comprises a centrifugal disc having at least one spring mounted pawl mounted thereon, said pawl arranged on said disc to rotate to an extended position when said disc reaches a predetermined speed.

13. The speed responsive brake of claim 12 wherein said brake element actuator further comprises a rod, one end of which is located adjacent said braking element and another end is located adjacent said disc such that upon extension of said pawl to an extended position, said another end of said rod is engaged by said pawl and said rod is driven into engagement with said braking element which, in turn, is driven into engagement with said upstream turn of the rope on the drum.

14. The speed responsive brake of claim 12 wherein said centrifugal disc is provided with a second, back up pawl.

15. The speed responsive brake of claim 11 wherein said rope engaging surface is tapered.

16. The speed responsive brake of claim 7 wherein said braking element is vertically offset relative to said speed sensing element such that said braking element is adapted to sandwich an upstream turn of the rope against the drum.

17. A centrifugal brake for use with a hoist having a rope wound around a rope drum mounted on a support plate, the brake comprising a housing adapted for attachment to said support plate, said housing having a rope wheel mounted on one end of a shaft for rotation with said shaft, said housing being formed with a thru slot for allowing a load end of the rope to pass therethrough in a first direction as the rope unwinds from the rope drum, said rope adapted to engage a peripheral surface of said rope wheel to thereby cause said rope wheel to rotate as a function of rope speed, said shaft having another end fixed to a centrifugal brake wheel having at least one pawl pivotably mounted thereon for swinging movement between inoperative and operative positions as a function of speed of rotation of said rope wheel; and a cam movable into engagement with said rope to stop movement of said rope through said housing upon movement of said at least one pawl to said operative positions and wherein said cam is laterally offset from said rope wheel such that the rope portion to be engaged by said cam is on said rope drum and is at least one and one half turns of said rope upstream of said load end of the rope passing through the housing.

18. The brake according to claim 17, and further compressing a connector rod having one end adapted to engage said cam and another end adapted to be engaged by said at least one pawl when in said operative position.

19. The brake according to claim 18 wherein said centrifugal brake wheel is located in a chamber isolated from said rope wheel.

20. The brake according to claim 17 wherein said rope wheel has a tapered rope engaging surface.

21. The brake according to claim 17 wherein said at least one pawl is normally biased to said inoperative position.

22. The brake according to claim 17 wherein said at least one pawl comprises a pair of pawls wherein a second pawl of said pair of pawls serves as a back up for said at least one pawl in the event of failure of said at least one pawl.

23. The brake according to claim 17 wherein said brake wheel is located relative to the rope drum such that the rope does not engage the rope wheel in a second direction opposite said one direction.

24. The brake according to claim 17 wherein said cam includes a wedge-shaped surface which is adapted to compress the rope against the housing.

* * * * *